(12) United States Patent
Pazur et al.

(10) Patent No.: US 8,394,896 B2
(45) Date of Patent: Mar. 12, 2013

(54) LIQUID α-OLEFIN VINYL ACETATE COMPOUNDS

(75) Inventors: Richard Pazur, Sarnia (CA); Lorenzo Ferrari, Brights Grove (CA)

(73) Assignee: Lanxess Inc., Sarnia, Ontario (CA)

( * ) Notice: Subject to any disclaimer, the term of this patent is extended or adjusted under 35 U.S.C. 154(b) by 1463 days.

(21) Appl. No.: 11/005,215

(22) Filed: Dec. 6, 2004

(65) Prior Publication Data

US 2006/0122302 A1    Jun. 8, 2006

(51) Int. Cl.
*C08F 218/08* (2006.01)
*C08L 31/04* (2006.01)

(52) U.S. Cl. ...... 525/330.3; 525/60; 525/61; 525/326.1; 525/387

(58) Field of Classification Search .......... 525/61, 525/330.3, 60, 326.1, 387
See application file for complete search history.

(56) References Cited

U.S. PATENT DOCUMENTS

| | | | | |
|---|---|---|---|---|
| 4,725,637 | A * | 2/1988 | Fernyhough et al. | 524/271 |
| 5,089,579 | A * | 2/1992 | Sutter et al. | 526/323.2 |
| 5,576,401 | A | 11/1996 | Steiger et al. | 526/65 |
| 6,133,367 | A * | 10/2000 | Arhart | 524/515 |
| 6,727,002 | B2 * | 4/2004 | Hoch et al. | 428/520 |
| 2003/0131934 | A1 | 7/2003 | Hochgesang | 156/295 |
| 2003/0135001 | A1 | 7/2003 | Hochgesang | 526/242 |
| 2003/0139524 | A1 | 7/2003 | Hochgesang | 524/571 |
| 2003/0139548 | A1 | 7/2003 | Hochgesang | 526/234 |

FOREIGN PATENT DOCUMENTS

| | | |
|---|---|---|
| EP | 307 755 | 3/1989 |
| EP | 307755 A2 * | 3/1989 |
| EP | 420 271 | 4/1991 |
| EP | 420271 A * | 4/1991 |
| EP | 1 591 485 | 11/2005 |

* cited by examiner

*Primary Examiner* — Kelechi Egwim
(74) *Attorney, Agent, or Firm* — Nicanor A. Kohncke

(57) ABSTRACT

The present invention relates to a liquid α-olefin vinyl acetate compound containing a liquid α-olefin vinyl acetate copolymer. Compositions according to the present invention have improved resistance to premature vulcanization as well as good physical properties and aging resistance. The present invention is also directed to a vulcanized compound containing a liquid ethylene vinyl acetate copolymer.

7 Claims, No Drawings

# LIQUID α-OLEFIN VINYL ACETATE COMPOUNDS

FIELD OF THE INVENTION

The present invention relates to a liquid α-olefin vinyl acetate compound containing a liquid α-olefin vinyl acetate copolymer. Compositions according to the present invention have improved resistance to premature vulcanization (scorch) and due to their excellent flow behavior, they are particularly suited to the rubber injection molding process. The present invention is also directed to a vulcanized compound containing a liquid ethylene vinyl acetate copolymer.

BACKGROUND OF THE INVENTION

Liquid ethylene vinyl acetate copolymers are conventionally used in many applications, including pressure sensitive adhesions. Currently Lanxess Corporation sells an EVM copolymer under the tradename Levamelt.

Levamelt® has opened up new ways of producing a variety of films with tailor-made properties for applications in many areas: food packaging, labels, adhesive tapes, footwear, sealants etc. The product line includes grades that are suitable for the production of cast and blown films.

Levamelt® is designed for extrusion processes. This technology is advantageous in comparison to solvent coating because it is solvent-free and does not require the expensive drying equipment that is necessary for dispersion coating. Because of its free-flowing granular form, Levamelt® is suitable for processing on standard single or twin-screw extruders. No prior art teaching has demonstrated for the use of Levamelt® in rubber injection molding applications.

US Patent Applications 2003/0139548, 2003/0135001, 2003/0139524 and 2003/0131934 teach the use other solventless liquid rubber polymers in rubber compounds, however there has been no teaching to prepare a compound in accordance with the present invention with a liquid α-olefin vinyl acetate copolymer.

SUMMARY OF THE INVENTION

The present invention relates to a liquid α-olefin vinyl acetate compound containing a liquid α-olefin vinyl acetate copolymer which does not contain a solvent. The liquid α-olefin vinyl acetate compound according to the present invention preferably contains a liquid ethylene vinyl acetate copolymer, a vulcanizing agent and optionally other compounding ingredients and additives.

Accordingly, the present invention also relates to a vulcanized compound containing a liquid α-olefin vinyl acetate copolymer. The present invention also relates to a process of preparing a vulcanized compound containing a liquid α-olefin copolymer.

Further, the present invention relates to shaped articles, such as seals, gaskets, hoses, bearing pads, stators, well head seals, valve plates, cable sheathing, wheel seals, rollers, pipe seals and couplings containing a vulcanized liquid α-olefin vinyl acetate compound.

DETAILED DESCRIPTION OF THE INVENTION

The present invention includes the use of liquid α-olefin vinyl acetate copolymers in vulcanized rubber compounds, wherein surprisingly no solvent is used to prepare the vulcanized rubber compound.

Suitable α-olefin copolymers include any of the α-olefins known to those skilled in the art, for example, ethylene, propene, n-butene, isobutene, pentene, hexene, 1-hexene, heptene, octene, 1-octene and higher homologues of these. Preference is given to ethylene and propene, more preference is given to ethylene.

As used throughout this specification, the term "ethylene vinyl acetate" or EVM is intended to have a broad meaning and is meant to encompass a copolymer wherein the amount of vinyl acetate repeat units present in the ethylene vinyl acetate copolymer is in the range of from 35 to 99.99% by weight, preferably in the range of from 40 to 90% by weight.

Suitable liquid EVM copolymers have a molecular weight determined indirectly via (Melt flow indice) MFI measurements and are important for assessing processing performance in the plastics industry. The flowability of the copolymer, measured at 190° C. under 21 N of force and, expressed in terms of MFI (ISO 1133) is preferably from 10-50 g/10 min, more preferably from 15-35 g/10 min. Suitable liquid EVM copolymers for use in compounds according to the present invention have a Mooney viscosity (ML 1+4@100 C) of 2 to 20 MU, more preferably from 5 to 15 MU. Gel Permeation Chromatography (GPC) is perhaps the most common technique in polymer technology to assess the molecular weight and molecular weight distribution of polymers. Levamelt elastomers were run on a GPC column and afterwards, processed using K=0.000112 and a=0.725 as constants for polystyrene in tetrahydrofuran solvent. Preferred ethylene vinyl acetate copolymers have a number average molecular weight of from 30,000 to 80,000 daltons, preferably from 45,000 to 65,000 daltons. Preferred ethylene vinyl acetate copolymers have a weight average molecular weight of from 200,000 to 400,000 daltons, preferably from 250,000 to 350,000 daltons. Preferred ethylene vinyl acetate copolymers possess a polydispersity index (Mw/Mn) of ranging from 2 to 8, preferably from 4 to 6. Preferred ethylene vinyl acetate copolymers are available commercially from Lanxess Corporation under the tradename Levamelt®.

The vulcanizing agent used to prepare the compound according to the present invention can be any known vulcanizing agent suitable for curing the liquid EVM copolymer. Since the EVM backbone contains no unsaturation in the form of double bonds, the most suitable vulcanizing agents are peroxide based systems as well as electron beam irradiation Preferred are the peroxide based vulcanizing agents. Useful peroxide crosslinking agents, include dicumyl peroxide (Di-Cup 40KE), di-tert.-butyl peroxide, benzoyl peroxide, 2,2'-bis (tert.-butylperoxy diisopropylbenzene (Vulcup® 40KE), benzoyl peroxide, 2,5-dimethyl-2,5-di(tert-butylperoxy)-hexyne-3,2,5-dimethyl-2,5-di(benzoylperoxy)hexane, (2,5-bis(tert.-butylperoxy)-2,5-dimethyl hexane and the like. Preferred curing agents are readily determined by means of a few preliminary experiments, which is within the scope of one skilled in the art. A preferred peroxide curing agent is commercially available under the tradename Di-Cup 40KE. The peroxide curing agent (60% active) is suitably used in an amount of 0.1 to 15 parts per hundred parts of rubber (phr), preferably 2 to 6 phr. Too much peroxide may lead to an undesirably violent reaction.

Vulcanizing co-agents can also be added to the composition of the present invention. Mention is made of triallyl isocyanurate (TAIC), commercially available under the trademark DIAK#7 from DuPont Or N,N'-m-phenylene dimaleimide known as HVA-2 (DuPont), triallyl cyanurate (TAC) or liquid polybutadiene known as Ricon D 153 (supplied by Sartomer). Amounts can be equivalent to the peroxide curative or less, preferably less.

The present invention may also include the use of other solid rubber copolymers. Suitable solid rubbers include as BR (polybutadiene), ABR (butadiene/acrylic acid-$C_1$-$C_4$-alkylester-copolymers), EVA (ethylene vinyl acetate-copolymers), AEM (ethylene acrylate-copolymers), CR (polychloroprene), IR (polyisoprene), SBR (styrene/butadiene-copolymers) with styrene contents in the range of 1 to 60 wt %, EPDM (ethylene/propylene/diene-copolymers), FKM (fluoropolymers or fluororubbers), NBR (acrylonitrile/butadiene copolymers), HNBR (hydrogenated NBR), HXNBR (hydrogenated carboxylated NBR) and mixtures of the given polymers. The amount of natural and/or synthetic rubbers will depend on the process condition to be applied during manufacture of shaped articles and is readily available by few preliminary experiments.

The present inventive liquid EVM compound further can contain at least one filler. The filler may be an active or an inactive filler or a mixture thereof. The filler may be:

highly dispersed silica's, prepared e.g. by the precipitation of silicate solutions or the flame hydrolysis of silicon halides, with specific surface areas of in the range of from 5 to 1000 $m^2/g$, and with primary particle sizes of in the range of from 10 to 400 nm; the silica's can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 $m^2/g$ and primary particle diameters in the range of from 10 to 400 nm;

natural silicates, such as kaolin and other naturally occurring silica;

glass fibers and glass fiber products (matting, extrudates) or glass microspheres;

carbon blacks; the carbon blacks to be used here are prepared by the lamp black, furnace black or gas black process and have preferably BET (DIN 66 131) specific surface areas in the range of from 20 to 200 $m^2/g$, e.g. SAF, ISAF, HAF, FEF or GPF carbon blacks;

rubber gels, especially those based on polybutadiene, butadiene/styrene copolymers, butadiene/acrylonitrile copolymers and polychloroprene; or mixtures thereof.

magnetoplumbite-structure ferrite particles such as barium ferrite particles, strontium ferrite particles or barium-strontium ferrite particles having an average particle size of from 0.1 to 20.0 μm, a BET specific surface area of from 1 to 10 m/g, and a coercive force (iHc) of from 1,500 to 7,000 Oe;

powdered, optionally modified with organic modifiers, smectite clays, such as sodium or calcium montmorillonite, or synthetic clays such as hydrotalcite and laponite Examples of useful mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, or, for example, between 10 and 50 microns or, further for example, between 10 and 25 microns. According to the present invention, less than 10 percent by volume of the agglomerate particles should be below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil S and Vulkasil N, from Bayer AG.

Often, use of carbon black as a filler is preferable. Usually, carbon black is present in the polymer composition in an amount of in the range of from 0.1 to 200 phr, preferably 10 to 100, more preferably 40 to 80 phr.

Further, it might be advantageous to use a combination of carbon black and mineral filler in the inventive polymer composite. In this combination the ratio of mineral fillers to carbon black is usually in the range of from 0.05 to 20, preferably 0.1 to 10.

The rubber elastomer according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber.

According to the present invention, the composition can contain in the range of 0.1 to 20 phr of an organic fatty acid as an auxiliary product, such as a unsaturated fatty acid having one, two or more carbon double bonds in the molecule which more preferably includes 10% by weight or more of a conjugated diene acid having at least one conjugated carbon-carbon double bond in its molecule. Those fatty acids can have in the range of from 8-22 carbon atoms, or for example from 12-18. Examples include stearic acid, palmitic acid and oleic acid and their calcium-, zinc-, magnesium-, potassium- and ammonium salts.

According to the present invention, the composition can contain in the range of 5 to 50 phr of an acrylate as an auxiliary product. Suitable acrylates are known from EP-A1-0 319 320, in particular p. 3, l. 16 to 35, from U.S. Pat. No. 5,208,294, see Col. 2, l. 25 to 40, and from U.S. Pat. No. 4,983,678, in particular Col. 2, l. 45 to 62. Reference is made to zinc acrylate, zinc diacrylate or zinc dimethacrylate or a liquid acrylate, such as trimethylolpropane-trimethacrylate (TRIM), butanedioldimethacrylate (BDMA) and ethylenglycoldimethacrylate (EDMA). It might be advantageous to use a combination of different acrylates and/or metal salts thereof. It may also be advantageous to use metal acrylates in combination with a Scorch-retarder such as sterically hindered phenols (e.g. methyl-substituted aminoalkylphenols, such as 2,6-di-tert.-butyl-4-dimethylaminomethylphenol).

An antioxidant may be used in preparing a compound according to the present invention. Examples of suitable antioxidants include p-dicumyl diphenylamine (Naugard® 445), Vulkanox® DDA (a diphenylamine derivative), Vulkanox® ZMB2 (zinc salt of methylmercapto benzimidazole), Vulkanox® HS (polymerized 1,2-dihydro-2,2,4-trimethyl quinoline) and Irganox® 1035 (thiodiethylene bis(3,5-di-tert.-butyl-4-hydroxy)hydrocinnamate or thiodiethylene bis (3-(3,5-di-tert.-butyl-4-hydroxyphenyl)propionate supplied by Ciba-Geigy. Vulkanox is a trademark of Bayer AG.

The liquid EVM containing compounds according to the present invention can be prepared in any known suitable manner. Typically the components are mixed at a temperature that may range from 100 to 150° C. Normally the mixing time does not exceed 10 minutes and a time in the range from 3 to 5 minutes is usually adequate. Mixing is suitably carried out in an internal mixer such as a Banbury mixer, or a Haake or Brabender miniature internal mixer or a twin or single screw extruder. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

The liquid EVM containing compound according to the present invention is especially suitable for injection molding articles such as the present invention relates to shaped articles, such as seals, gaskets, hoses, bearing pads, stators, well head seals, valve plates, cable sheathing, wheel seals, rollers, pipe seals and couplings.

EXAMPLES

Description of Tests

Cure Rheometry:

Vulcanization testing was carried out on a Moving Die Rheometer (MDR 2000(E)) using a frequency of oscillation of 1.7 Hz and a 1° arc at 180° C. for 30 minutes total run time. The test procedure follows ASTM D-5289.

Compound Mooney Viscosity and Scorch:

A large rotor was used for these tests in compliance with the ASTM method D-1646. The compound Mooney viscosity was determined at 100° C. by preheating the sample 1 minute and then, measuring the torque in Mooney viscosity units after 4 minutes of shearing action caused by the viscometer disk rotating at 2 r.p.m. Mooney scorch measurements were taken as the time from the lowest torque value to a rise of 5 Mooney units (t05). Mooney scorch measurements were carried out at both 125 and 135° C.

Stress-Strain:

Samples were prepared by curing a tensile slab at 180° C. for 12 minutes. Afterwards, samples were died out into standard ASTM die C dumbells. The testing was conducted at 23° C. and complies with ASTM D-412 Method A.

Hardness:

All hardness measurements were carried out with an A-2 type durometer at 23° C. following the procedure outlined in ASTM D-2240.

Tear Resistance:

A tensile sheet was cured 12 minutes at 180° C. and the appropriate samples of Die B and Die C geometries were died out. Both tests are designed to give an indication of the resistance to tear of the rubber. The test procedure complies with ASTM D 624.

Low Temperature Properties:

Temperature retraction (TR) testing gives an indication of the low temperature stiffening effects in the tension mode. It was run according to ASTM D 1329. Brittle points were determined using the method outline in ASTM D746. The lowest temperature at which 3 out 5 samples (Method A) will not fracture or crack is recorded.

Compression Set:

This test complies with ASTM D395 (Method B). Solid button type samples were cured for 17 minutes at 180° C. and the sample subjected to a 25% compression deflection during hot air aging at 150° C. for 168 and 504 hours.

Stress Strain Hot Air Aging:

Hot air aging of die C cut tensile samples were carried in hot air circulating oven set at 175° C. for a period of 1 week. This test complies to ASTM D573.

Liquid Immersion Aging:

This test evaluates the change in vulcanizate properties resulting from immersion in liquids usually tested at elevated temperatures. Samples were exposed to Service Fluid 105 (SF105) and aged for a period of 504 hours at 150° C. The procedure for aging and testing of the samples conforms to ASTM D471.

Preparations of Examples:

The formulations used were based on the recipes according to Table 1, all quantities are based per one hundred parts rubber.

The compound formulations of Table 1 were mixed on a Banbury (BR-82) internal mixer using tangential rotors. The mixing chamber capacity was 1.602 L. The rotors were set to turn at 77 rpm and cooling was carried out by water set at 30° C. At time 0 min, the EVM copolymer was introduced into the mixer, along with the Armeen 18D, the totality of the carbon black, the Naugard 445, the Rhenogran P-50, stearic acid and the Vanfre Vam. The ram was lowered and mixing was carried out for 2 minutes, at which time the ram was raised and the throat of the mixer was swept. The ram was again closed for an additional 2 minutes and the material was dumped from the mixing chamber after 4 minutes to total mixing time.

The dumped material was now transferred to a 10"×20" mill (cooled at 30° C.). The Rhenofit TAC/S and Vulcup 40KE were added to the rolling bank of the compound. Three quarter cuts assured the homogeneity of the mixing ingredients throughout the compound and the final mix was subjected to six endwise passes directly through the nip.

Table 1: Formulations

TABLE 1

| Compound Formulations | | | |
| --- | --- | --- | --- |
| Component | Comp. Ex. 1 | Comp. Ex. 2 | Ex. 3 |
| ARMEEN 18D | 0.5 | 0.5 | 0.5 |
| CARBON BLACK, N 550 | 55 | 55 | 55 |
| LEVAMELT 8896 EVM | 0 | 0 | 100 |
| LEVAPREN 700 HV | 0 | 100 | 0 |
| LEVAPREN KA 8784 | 100 | 0 | 0 |
| NAUGARD 445 | 1.5 | 1.5 | 1.5 |
| RHENOGRAN P-50 | 3 | 3 | 3 |
| STEARIC ACID EMERSOL 132 NF | 0.5 | 0.5 | 0.5 |
| VANFRE VAM | 1 | 1 | 1 |
| ZINC OXIDE (KADOX 920) | 2 | 2 | 2 |
| RHENOFIT TAC/S | 3.5 | 3.5 | 3.5 |
| VULCUP 40KE | 4 | 4 | 4 |
| PHRs | 171 | 171 | 171 |
| SPECIFIC GRAVITY | 1.254 | 1.262 | 1.262 |

Levamelt ™ VP KA 8896 from Bayer AG
Levapren ® 700 HV from Bayer AG
Levapren ® VP KA 8784 from Bayer AG
Armeen ® 18D is an octadecylamine from Akzo Nobel
Vanfre ® VAM is a complex organic alkyl acid phosphate processing aid available from R.T. Vanderbilt Company.
Carbon Black N 550 is available from Cabot Tire Blacks.
Naugard ® 445 is a diphenylamine A/O available from Crompton.
Rhenogran ® P-50 is a polycarbodiimide available from Rhein Chemie Corporation.
Emersol 132 NF is a stearic acid available from Acme-Hardesty Co.
Kadox 920 is a zinc oxide is available from St. Lawrence Chem. Inc.
Rhenofit ® TAC/S is a peroxide activator available from Rhien Chemie Corporation.
Vulcup 40KE is 1,3Bis(tert-butylperoxyisopropyl)benzene available from Geo Specialty Chemicals. Inc.

TABLE 2

Rheology

| Measurement | Ex. 1 | Ex. 2 | Ex. 3 |
|---|---|---|---|
| ML (1 + 4 @ 100° C.) (MU) | 67.1 | 45.9 | 24.5 |
| t Value t05 (min) 125° C. | >30 | >30 | >30 |
| t Value t05 (min) 135° C. | 12.17 | 20.82 | >30 |
| MH (dN · m) | 37.08 | 39.05 | 32.08 |
| ML (dN · m) | 1.86 | 1.03 | 0.51 |
| Delta MH-ML (dN · m) | 35.22 | 38.02 | 31.57 |
| t' 90 (min) | 5.3 | 5.26 | 5.37 |

TABLE 3

Physical Properties

| Measurement | Ex. 1 | Ex. 2 | Ex. 3 |
|---|---|---|---|
| Hardness Shore A2 (pts.) | 71 | 73 | 71 |
| Ultimate Tensile (MPa) | 21.39 | 19.74 | 15.39 |
| Ultimate Elongation (%) | 156 | 162 | 157 |
| Stress @ 25 (MPa) | 1.9 | 2.2 | 1.7 |
| Stress @ 50 (MPa) | 4.6 | 5.0 | 3.6 |
| Stress @ 100 (MPa) | 13.7 | 13.0 | 9.8 |
| Tear Strength (kN/m) Die C | 17.5 | 18.3 | 16.7 |
| Tear Strength (kN/m) Die B | 38.0 | 35.1 | 38.6 |

TABLE 4

Low temperature properties

| Measurement | Ex. 1 | Ex. 2 | Ex. 3 |
|---|---|---|---|
| Brittle point (° C.) | −22 | −20 | −19.5 |
| TR 10 (° C.) | −18.7 | −19.4 | −18.6 |
| TR 30 (° C.) | −14.2 | −14.5 | −13.5 |
| TR 50 (° C.) | −11.4 | −11.8 | −9.5 |
| TR 70 (° C.) | −8.3 | −9 | −5.4 |

TABLE 5

Hot air aging resistance (150° C.) - compression

| Measurement | Ex. 1 | Ex. 2 | Ex. 3 |
|---|---|---|---|
| Compression Set (%) 168 hrs | 26.34 | 21.78 | 26 |
| Compression Set (%) 504 hrs | 42.22 | 35.38 | 44.71 |

TABLE 6

Hot air aging resistance (168 hrs at 175° C.) - tension

| Measurement | Ex. 1 | Ex. 2 | Ex. 3 |
|---|---|---|---|
| Chg. Hard. Shore A2 (pts.) | 11 | 10 | 11 |
| Chg. Ulti. Tens. (%) | −19 | −15 | −12 |
| Chg. Ulti. Elong. (%) | −28 | −17 | −16 |
| Change Stress @ 25 (%) | 97 | 99 | 131 |
| Change Stress @ 50 (%) | 55 | 49 | 72 |
| Change Stress @ 100 (%) | 14 | 7 | 15 |

TABLE 7

Oil resistance (SF105, 504 hrs at 150° C.)

| Measurement | Ex. 1 | Ex. 2 | Ex. 3 |
|---|---|---|---|
| Chg. Hard. Shore A2 (pts.) | −12 | −11 | −14 |
| Chg. Ulti. Tens. (%) | −16 | −12 | −13 |
| Chg. Ulti. Elong. (%) | 2 | 8 | 11 |
| Change Stress @ 25 (%) | −36 | −39 | −40 |
| Change Stress @ 50 (%) | −37 | −37 | −40 |
| Change Stress @ 100 (%) | −27 | −27 | −31 |
| Wt. Change (%) | 13.2 | 13 | 14.3 |
| Vol. Change (%) | 19.4 | 19.4 | 21 |

Table 2 clearly illustrates the improvement in compound flow by way of the compound Mooney viscosity in Ex. 1 to Ex. 3, the latter being the liquid EVM compound. Excellent compound flow is extremely desired in the fabrication of molded articles via injection molding methods. Compound Mooney scorch measured at 125° C. does not show any measurable differences in scorch safety between the examples. However, it becomes obvious at 135° C. that the lower Mooney EVM possesses the best scorch resistance. Increased scorch resistance not only lengthens the mixed compound life, but it prevents possible plugging of injection machine runner systems and any possible incomplete mold filling. The MH and MH-ML torque values suggest a slighter lower crosslink density for Ex.3. ML which is representative of compound flow at 180° C., shows clearly the superior flow characteristics of Ex. 3. Time to 90% cure is for all intents and purposes the same for all examples.

Table 3 illustrates the physical property characteristics of the three EVM examples. Lower Mooney EVM brings about lower tensile strength and modulus values but still provides a robust compound for molded article applications. The lower modulus values were expected as seen in the rheometry MH and MH-ML values. Hardness, elongation and tear strength values are not affected using a lower molecular weight EVM.

Low temperature behavior of the three compounds is illustrated in Table 4 by way of brittle point and temperature retraction measurements. Lower Mooney EVM vulcanizates have a slight effect on low temperature properties causing higher temperature values. Use of a suitable plastifying agent may be considered for suitable low temperature performance.

Hot air aging in tension provided in Table 6 show similar hardness and stress strain property changes for the 3 examples.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A compound comprising a liquid ethylene vinyl acetate copolymer and a vulcanizing agent, wherein the ethylene vinyl acetate copolymer has a weight average molecular weight of 250,000 to 350,000 daltons and wherein the liquid ethylene vinyl acetate copolymer is solventless, wherein the ethylene vinyl acetate has a MFI (ISO 1133) of between about 15 to 35 g/10 min and a Mooney viscosity (ML 1+4@100° C.) of from 5 to 15 MU and wherein the composition does not include an additional solid rubber.

2. The compound according to claim 1, wherein the vulcanizing agent is selected from dicumyl peroxide, di-tert-butyl peroxide, benzoyl peroxide, 2,2'-bis(tert-butylperoxy diisopropylbenzene, benzoyl peroxide, 2,5-dimethyl-2,5-di(tert-butylperoxy)-hexyne-3, 2,5-dimethyl-2,5-di(benzoylperoxy)hexane, (2,5-bis(tert-butylperoxy)-2,5-dimethyl hexane or a mixture thereof.

3. The compound according to claim 1, further comprising at least one mineral filler.

4. The compound according to claim 1, further comprising at least one reaction accelerator, vulcanizing accelerator, vulcanizing acceleration auxiliary, antioxidant, foaming agent, anti-aging agent, heat stabilizer, light stabilizer, ozone stabilizer, processing aid, plasticizer, tackifier, blowing agent, dyestuff, pigment, wax, extender, organic acid, inhibitor, metal oxide or activator.

5. A vulcanized rubber compound comprising a solventless liquid α-olefin vinyl acetate copolymer and a vulcanizing agent,
    wherein the ethylene vinyl acetate copolymer has a weight average molecular weight of 250,000 to 350,000 daltons,
    wherein the liquid ethylene vinyl acetate copolymer is solventless,
    wherein the ethylene vinyl acetate has a MFI (ISO 1133) of between about 15 to 35 g/10 min and a Mooney viscosity (ML 1+4@100° C.) of from 5 to 15 MU, and
    wherein the composition does not include an additional solid rubber.

6. A shaped article comprising the compound according to claim 5.

7. A shaped article according to claim 6, wherein the shaped article is a seal, gasket, hose, bearing pad, stator, well head seal, valve plate, cable sheathing, wheel seal, roller, pipe seal or coupling.

* * * * *